April 14, 1925.
C. G. BATHE
1,533,366
COMBINED PLEASURE AND FISHING BOAT
Filed Aug. 21, 1924  2 Sheets-Sheet 1
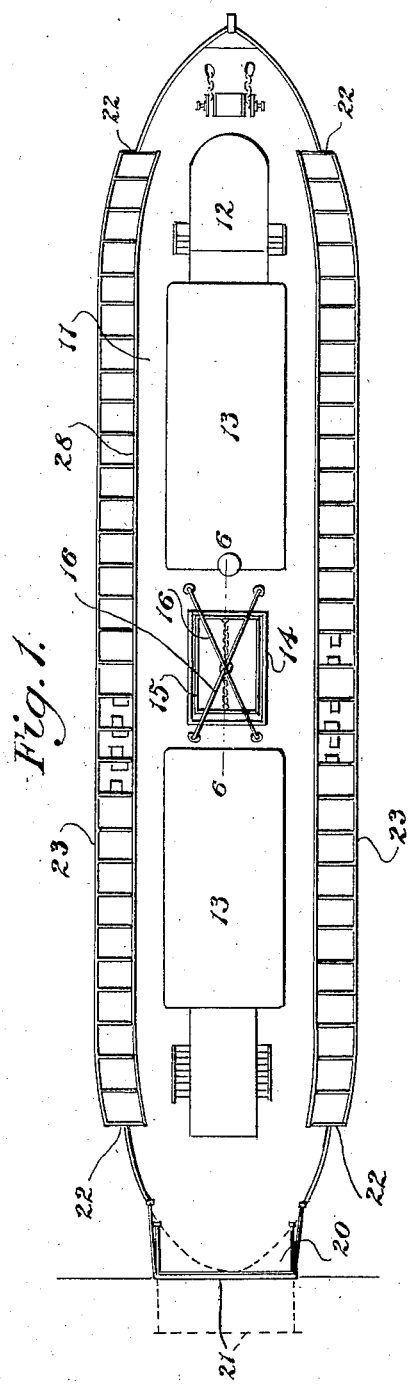
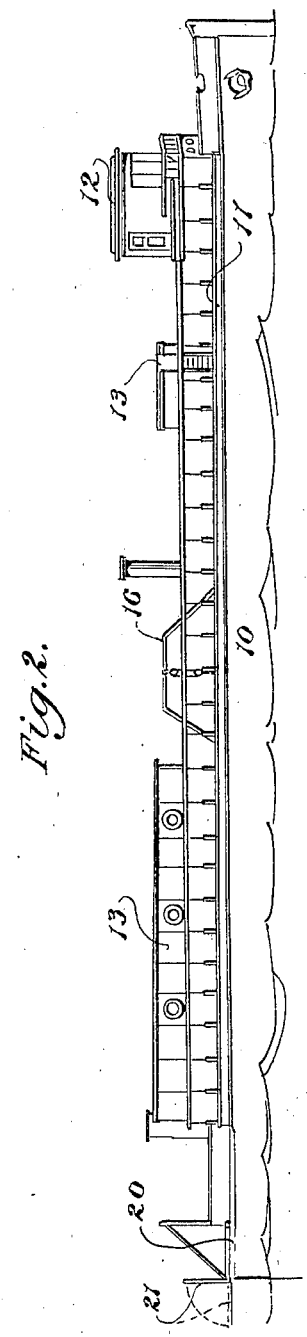
Inventor:
CHARLES G. BATHE.
by Martin C. Smith, Atty.

April 14, 1925.  
C. G. BATHÉ  
1,533,366  
COMBINED PLEASURE AND FISHING BOAT  
Filed Aug. 21, 1924  2 Sheets-Sheet 2
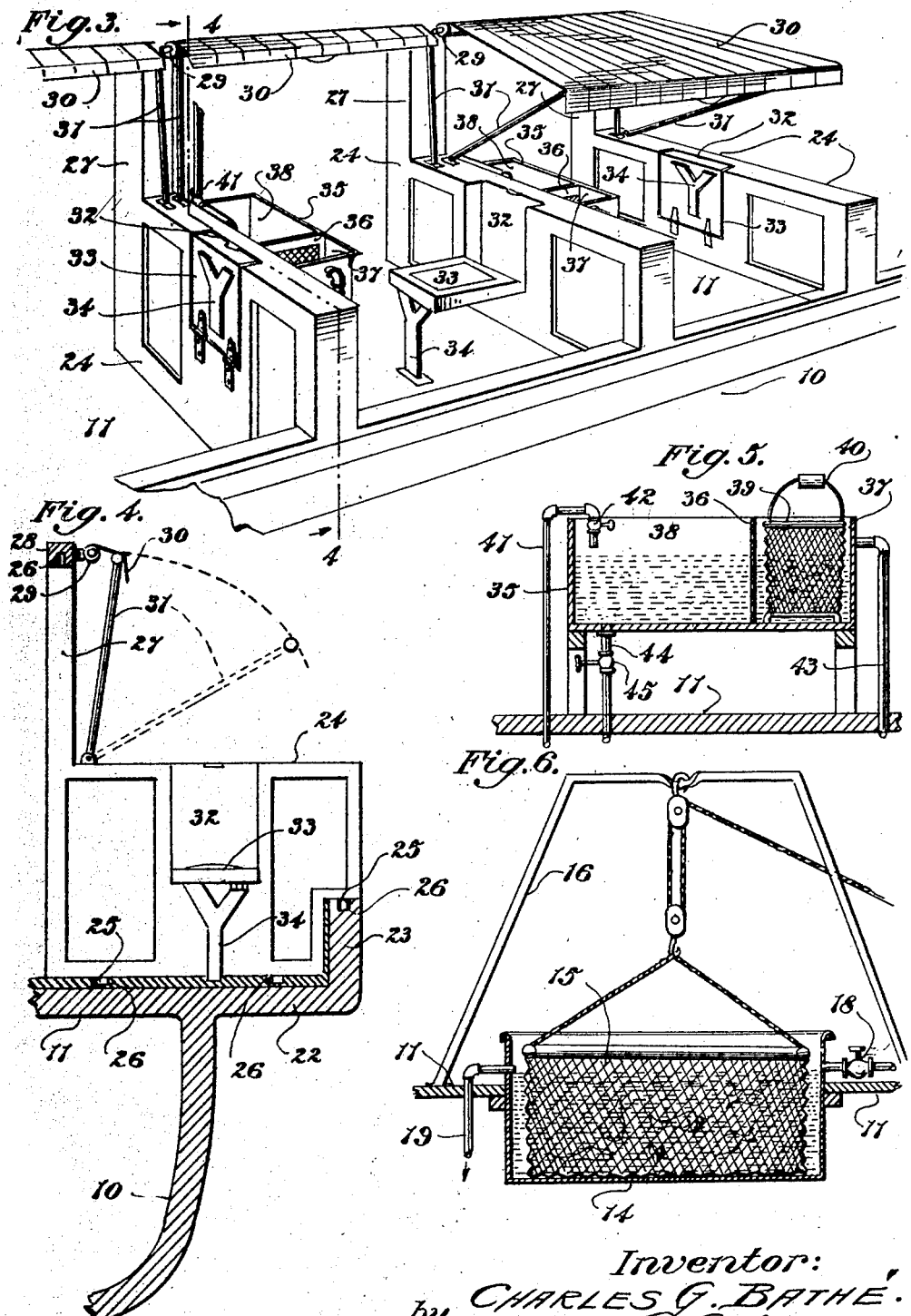
Inventor:
CHARLES G. BATHÉ
by Martin P. Smith Atty.

Patented Apr. 14, 1925.

1,533,366

UNITED STATES PATENT OFFICE.

CHARLES G. BATHÉ, OF ALHAMBRA, CALIFORNIA, ASSIGNOR OF ONE-EIGHTH TO MINNIE H. WATSON, OF LOS ANGELES, CALIFORNIA, AND ONE-EIGHTH TO NATHANIEL W. WIEDRICK, OF LONG BEACH, CALIFORNIA.

COMBINED PLEASURE AND FISHING BOAT.

Application filed August 21, 1924. Serial No. 733,294.

*To all whom it may concern:*

Be it known that I, CHARLES G. BATHÉ, a citizen of the United States, residing at Alhambra, in the county of Los Angeles and State of California, have invented certain new and useful Improvements in Combined Pleasure and Fishing Boats, of which the following is a specification.

My invention relates to a combined pleasure and fishing boat, the principal objects of my invention being to construct a power-driven boat having individual compartments and accommodations for a large number of fishermen; to arrange the individual compartments along the sides of the main deck of the boat where the fishermen may conveniently cast their lines into the water; to provide each compartment with a live bait receptacle and a receptacle for the caught fish; to provide means for maintaining a continuous flow of fresh water through all of the live bait compartments and the caught fish receptacles; to provide each fisherman's compartment with a folding seat and an awning that may be lowered or raised as desired; to arrange the partitions between the individual compartments so that the same may be readily removed and stored below decks or elsewhere, thereby providing increased deck space; and, further, to equip one end of the hull of the boat with a landing platform or gang plank that may be lowered when the boat is landed at a pier or the like.

With the foregoing and other objects in view, my invention consists in the features of construction and combination and arrangement of parts hereinafter more fully described and claimed, reference being had to the acompanying drawings, in which:

Figure 1 is a top plan view of a combined pleasure and fishing boat of my improved construction;

Figure 2 is a side elevation of the boat;

Figure 3 is a perspective view of a portion of the side of the boat deck, showing the individual fishing compartments that are arranged along the edge of the deck;

Figure 4 is a vertical section taken approximately on the line 4—4 of Figure 3;

Figure 5 is a vertical section taken through the live bait box and caught fish receptacle that is located in each fisherman's compartment;

Figure 6 is an enlarged section taken on the line 6—6 of Figure 1.

Referring by numerals to the accompanying drawings, 10 designates the hull of the boat which may be of any desired length and width, 11 the deck of the boat, and upon the forward portion of said deck may be located an elevated cabin 12 for the accommodation of the officers of the boat and the pilot or helmsman. Arranged on the central portion of the deck at suitable points to the rear of the cabin 12 may be located closed or partially closed structures, such as 13, which may be used as dining rooms, dancing rooms, or they may be fitted up with cabins and sleeping quarters for the boat crew and the passengers.

Located at a suitable point on the boat, and preferably at a point midway between the ends thereof, is a comparatively large tank 14 that extends below the deck a suitable distance and arranged therein is a large receptacle 15 which may serve as a storage cage for the fish that are caught by the fishermen. This storage receptacle is adapted to be elevated and withdrawn from the tank 14 in any suitable manner, preferably by means of a block and tackle that is suspended from a suitable support 16. Leading to the upper portion of tank 14 from a suitably located pump or the like is a fresh water supply pipe 17 having a valve 18 and leading from the opposite side of said tank is an overflow pipe 19. The arrangement just described provides means for taking care of a large number of fish while the boat is on a short cruise, and by elevating the container 15 the fish may be readily unloaded when the boat reaches its dock or landing place.

Arranged at one end of the boat or at a suitable point on the side thereof is an extended platform 20, and hinged to the outer edge thereof is a landing stage or gang plank 21 that is normally retained in a vertical position by suitable ropes or cables and which may be lowered into a horizontal plane as shown by dotted lines, Figure 2, when the boat is making a landing at an anchored barge or while receiving passengers from a small boat.

The deck 11 of the boat projects a short distance beyond each side thereof, as designated by 22, and the gunwales 23 are arranged along the outer edges of the projecting portions 22. Transversely disposed upon the side portions of the deck and immediately inside of the gunwales 23 are partitions 24, the same being detachably mounted in position by means of dowel pins 25 or the like that enter suitably located recesses 26 in the deck and in the upper edge of the gunwales.

Projecting upwardly near the ends of the partitions 24 are posts, such as 27, and the upper ends of the latter are detachably connected to a longitudinally disposed rail 28. As a result of the arrangement just described, the partitions between the individual compartments may be readily removed and stored below deck or elsewhere, thus giving clear spaces along both sides of the deck of the boat, which clear spaces may be utilized for athletic exercises, dancing or the like.

Mounted on rail 28 above each compartment is a roller 29 upon which is adapted to wind an awning 30, the front portion thereof being connected to an inverted U-shaped awning supporting frame 31, the lower ends of the side legs or arms of which are suitably hinged to the rear portions of the partitions 24. Thus each compartment is provided with an awning that may be raised or lowered as desired. Formed in one side of each partition 24 is a recess or pocket 32 that is adapted to be occupied by a folding seat 33, which latter when lowered into a substantially horizontal position is supported by a folding leg, such as 34. Supported within each compartment, and preferably alongside each partition 24, is a receptacle 35, preferably of sheet metal, having a perforated partition 36, which latter divides the space within the receptacle into a live bait chamber 37 and a caught fish chamber 38. Removably arranged within each live bait chamber 36 is a live bait receptacle 39 of perforated or reticulated material, the same having a handle 40 whereby it may be readily lifted and handled, and leading from a suitable supply pipe to each receptacle 35 is a fresh water supply pipe 41 that is equipped with a valve 42. Leading from the receptacle 35 is an overflow pipe 43, and leading from the bottom of each receptacle is a clean-out or flushing pipe 44 that is provided with a valve 45.

Thus the occupant of each compartment is provided with a live bait receptacle 39 and with a compartment 38 that may serve as a temporary receptacle or container for the caught fish and the latter, as well as the live bait, may be kept alive by opening valve 42 and permitting fresh water to constantly flow through the chambers within receptacle 35. In the event that a fisherman catches more fish than can be conveniently accommodated by the chamber 38, these fish may be transferred to the large caught fish receptacle 15 that occupies tank 14.

Thus it will be seen that I have provided a combined pleasure and fishing boat wherein each fisherman may occupy an individual compartment, each compartment being provided with a folding seat, an awning, a live bait receptacle and a caught fish receptacle, and with connections whereby fresh water is permitted to flow through the live bait and caught fish compartments, thereby keeping the live bait and caught fish alive.

If desired, the landing stage or gang plank 21 may be lowered into a substantially horizontal position while the boat is on a cruise, thereby providing ample space for fishermen who may desire to fish by trolling or casting methods.

It will be readily understood that various changes may be made in the size, form and construction of my improved pleasure and fishing boat without departing from the spirit of my invention, the scope of which is set forth in the appended claims.

I claim as my invention:

1. The combination, with a boat, of a series of partitions arranged along the gunwales of said boat to form a series of separate compartments, a receptacle within each compartment, which receptacle is provided with a live bait compartment and a caught fish compartment, and means for effecting a constant flow of fresh water through said receptacle.

2. The combination, with a boat, of a series of partitions arranged along the gunwales of said boat to form a series of separate compartments, an awning arranged for operation above each compartment and a folding seat within each compartment.

3. The combination, with a boat, of a series of partitions arranged along the gunwales of said boat to form a series of separate compartments, an awning arranged for operation above each compartment, a folding seat within each compartment, and a combined live bait receptacle and caught fish receptacle within each compartment.

4. The combination, with a boat hull, having a series of separate compartments arranged along its gunwales, of an awning for each compartment, a folding seat within each compartment, a combined live bait and caught fish receptacle within each compartment, and means whereby a flow of fresh water may be constantly admitted to said combined live bait and caught fish receptacle.

5. The combination, with a boat hull, of a series of partitions removably mounted on the deck of the boat hull adjacent to its gunwales to form a series of separate compartments, and a folding seat carried by each partition.

6. The combination, with a boat hull, of a series of partitions removably mounted on the deck of the boat hull adjacent to its gunwales to form a series of separate compartments, a folding seat carried by each partition, and an awning supported by said partitions being arranged for operation above each compartment.

7. The combination, with a boat hull, of a series of partitions removably mounted on the deck of the boat hull adjacent to its gunwales to form a series of separate compartments, a folding seat carried by each partition, an awning supported by said partitions being arranged for operation above each compartment, and a combined live bait receptacle and caught fish receptacle within each compartment.

8. The combination, with a boat having a series of separate compartments arranged along its deck adjacent to its gunwales, of a receptacle located within each compartment, said receptacle having a perforated partition to provide a live bait chamber and a caught fish chamber, and a reticulated live bait container removably positioned in the live bait chamber.

9. The combination, with a boat having a series of separate compartments arranged along its deck adjacent to its gunwales, of a receptacle located within each compartment, said receptacle having a perforated partition to provide a live bait chamber and a caught fish chamber, a reticulated live bait container removably positioned in the live bait chamber, and means for producing a constant flow of fresh water through said receptacle and its compartments.

In testimony whereof I affix my signature.

CHARLES G. BATHÉ.